Figure 1:
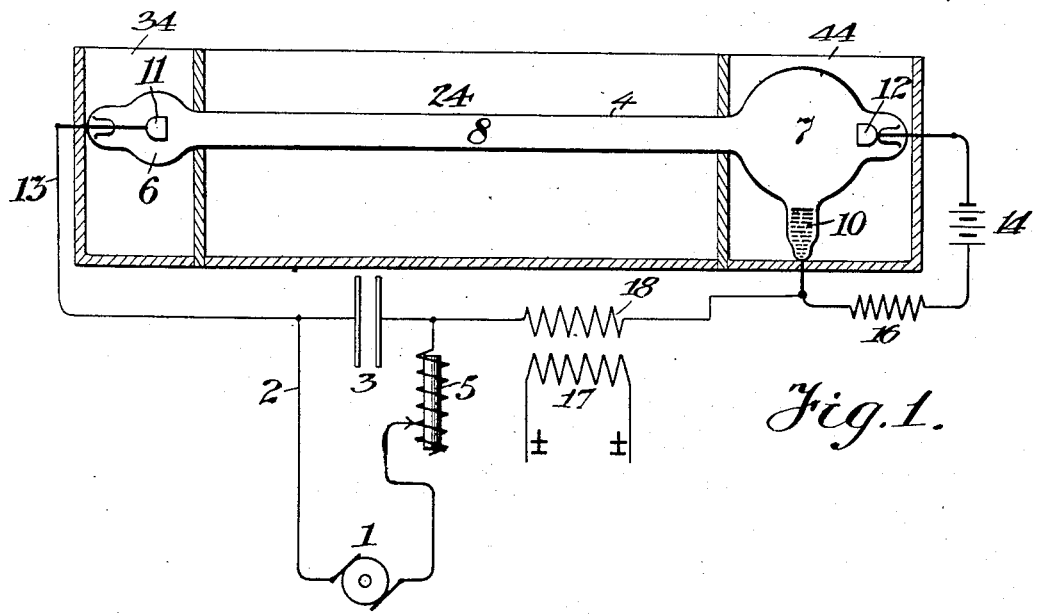

P. C. HEWITT.
METHOD OF AND APPARATUS FOR TRANSFORMING ELECTRICAL ENERGY.
APPLICATION FILED APR. 16, 1915.

1,321,438.

Patented Nov. 11, 1919.

WITNESSES

INVENTOR
Peter Cooper Hewitt
BY
ATTORNEY

UNITED STATES PATENT OFFICE.

PETER COOPER HEWITT, OF RINGWOOD MANOR, NEW JERSEY, ASSIGNOR, BY MESNE ASSIGNMENTS, TO COOPER HEWITT ELECTRIC COMPANY, OF HOBOKEN, NEW JERSEY, A CORPORATION OF NEW JERSEY.

METHOD OF AND APPARATUS FOR TRANSFORMING ELECTRICAL ENERGY.

1,321,488.          Specification of Letters Patent.     Patented Nov. 11, 1919.

Original application filed July 1, 1905, Serial No. 267,982. Patent No. 1,224,639, dated May 1, 1917. Divided and this application filed April 16, 1915. Serial No. 21,843.

*To all whom it may concern:*

Be it known that I, PETER COOPER HEWITT, a citizen of the United States, and resident of Ringwood Manor, county of Passaic, State of New Jersey, have invented certain new and useful Improvements in Methods of and Apparatus for Transforming Electrical Energy, of which the following is a specification.

In various of my prior patents dated September 17th, 1901, and bearing the Numbers 682,690 to 682,699, inclusive, for inventions in and relating to inclosed vapor conductors I have described how such devices may be thoroughly cleansed and evacuated to produce the required qualities and characteristics of operation by conducting such operation during the process of manufacture before sealing off and then upon development of the required conditions and reactions completing the device by sealing off. I have also described that under certain conditions particularly where a condenser is bridged across the terminals of the device, when connected in circuit, its action is intermittent and the electric current impulses or oscillations can be made with the frequency desired and so rapid as to require a most delicate instrument to detect that the passage of current is not continuous. I have also described the object of the condenser as being to accumulate the electric currents during the minute period of time when the current is not passing through the intermittently acting vapor conductor device, the device acting somewhat as a discharge for the condenser producing waves or pulsations in the current flowing in its circuit.

More particularly and specifically in my prior Letters Patent Nos. 780,999 and 781,000 granted to me on January 31, 1905, I have described and claimed this intermittent action of the devices referred to in producing oscillations or impulses of a desired frequency in a capacity circuit, thus covering the use of my inclosed vapor conductors as discharge devices or discharge gaps for condenser, capacity or other circuits wherein the function of a discharge gap is necessary or desirable.

I have shown and described the source of energy as being any convenient source as for instance a continuous current generator and the discharge device as being of the character described in my patent and I have shown for purposes of illustration, a form of device in which the terminals or electrodes are dissimilar, one being a solid and the other a volatile liquid such as mercury.

In my application Ser. No. 243,217 filed January 30, 1905, and patented December 15th 1914, Number 1,121,360, the discharge device shown and claimed is the species of inclosed vapor conductor device wherein the terminals of the electrodes are preferably similar in construction and in material, are preferably formed of bodies of liquid, preferably metallic, preferably volatile and preferably mercury, while the source of supply may be a direct current source or an alternating source.

For purposes such as contemplated by the present invention either direct or alternating current may be used. The alternating current may be that of a special alternating current generator designed and arranged to effect a discharge each half cycle or an ordinary commercial design may be employed. In the latter case the current may be treated as a direct current flowing in one direction for a considerable period, followed by another direct current flowing in the opposite direction for a considerable period. This is because the time periods of operation of the discharge device may be and preferably are small as compared with the duration of a half cycle of an alternating current generator of the ordinary commercial periodicities. If the precaution is taken to properly design the alternating current generator so that it will have a flat top wave, all of the reactions and diagrams illustrative of the same during a half cycle will be practically identical with those of a continuous direct current source for a similar period. Of course on the second half wave the reactions and the diagrams will be symmetrical and reversed with respect to the first half cycle and for this reason the physically and electrically symmetrical form of discharge device shown herein is particularly desirable. It operates uniformly irrespective of the direction in which the condenser circuit is charged by the source of electrical energy and also with respect to the oscillatory discharge.

In connection with these prior inventions, I have described the use of the starting resistance of the negative electrode to prevent the starting of the current until a given electromotive force has been attained, the breaking down of this resistance by such electromotive force, the subsequent flow of current until the electromotive force has fallen to a certain value, the resulting cessation of flow and the final reconstruction of the negative electrode resistance. I have also described the negative electrode resistance acting in combination with that of a column of vapor conductor in series therewith which latter acts with its own characteristics in connection with and in somewhat the same manner as the former. In the invention hereof I have utilized the characteristic action of the vapor conductor alone with the negative electrode resistance at the electrode eliminated or practically so.

The negative electrode resistance becomes less with the increase of temperature of the electrode when mercury is present whereas the resistance of the vapor column becomes greater. Moreover the negative electrode resistance has a different range of possible values in practice, particularly as to the lower limits.

The interrupting action of the vapor column is particularly efficient in causing very sharp sudden interruptions, especially favorable to the production of high frequency oscillation and abrupt fluctuation. This is very markedly indicated in the practical working of the device and may be accounted for from the simultaneous coöperation of two causes operating separately to produce the same result. The discharge of the condenser through the device being once started the drop in voltage across the latter is approximately constant and the loss therein is nearly proportional to the current. The fall of voltage of the condenser supplying the current and the rise in the voltage necessary to keep the vapor column conducting, acts in opposite directions to cut short the flow thereby producing the characteristic abrupt interruption of current flow.

Another valuable characteristic of the vapor column is that its starting and interrupting voltages or resistances vary according to functions of the length, density and diameter of the column, being greater for greater length, and greater densities and less for greater diameters. The diameter is of great importance as a factor where the temperatures and densities are low but becomes progressively of less importance where these are high. Where vaporizable material is present the resistance of the vapor column varies directly as the temperature for all temperatures whereas the negative electrode resistance tends to vary inversely with the temperature and tends toward a constant around say 200° or 300° Fahrenheit.

From the above consideration it will be evident that not only is the interrupting action of the vapor column characteristically abrupt and therefore particularly efficient but it also lends itself very readily to the practical solution of problems of design for use in particular connections because its length may be extremely small, its diameter great and its density low thus adapting it for use in connection with the lowest voltages. In addition to this the range of high resistances by great length of column and small diameter and higher densities is very wide and limited only by practical considerations.

My present invention involves the practical elimination of the negative electrode factor of interruption found in the devices of my prior patents referred to and brings into operation and effect the characteristic resistances and interrupting action of the vapor column from vapor to vapor through vapor only. In practice the effects seem to be almost entirely free from any effect of either negative or positive electrode resistance other than that of vapor. This I accomplish by providing a supplemental electrode adjacent to the negative electrode of the circuit to be interrupted and making said supplemental electrode the positive electrode of an auxiliary local insulated circuit of a source of electromotive force, preferably a storage battery. The main negative electrode of the lamp I make the negative electrode of the storage battery circuit. The battery is of sufficient voltage to maintain the current through the vapor conductor between the adjacent terminals. This has the effect of maintaining the negative electrode of the circuit to be interrupted in its low resistance or operating condition, so that there is no negative electrode resistance to starting or practically none at the electrode to oppose the passage of the current to be started and interrupted.

Such an arrangement is unsymmetrical but is sufficient where the current to be interrupted is direct current and where it is not essential that the condenser discharge be oscillatory. It is evident, however, that where the source is an alternating current source or where the purposes in view require that the condenser discharge be oscillatory, it is preferable that each of the electrodes of the discharge device be provided with an adjacent supplemental electrode and a separate local circuit to maintain a current continuously flowing from such supplemental electrode to the main electrode precisely as hereinbefore described with respect to the first mentioned electrode.

When both electrodes are thus made actively conducting through small portions of the vapor column respectively, the remainder of the vapor column connecting these two zones or regions of activity acts as the interrupter in accordance with its own laws of operation, and free from material complication or modification by electrode resistance phenomena, in other words the device is in a sense a symmetrical vapor conductor interrupter having constantly conducting vapor electrodes.

In the accompanying drawings, Figure 1 is a view of a form of my discharge device with a direct current source, connecting circuits and auxiliary apparatus diagrammatically indicated.

Figure 2:
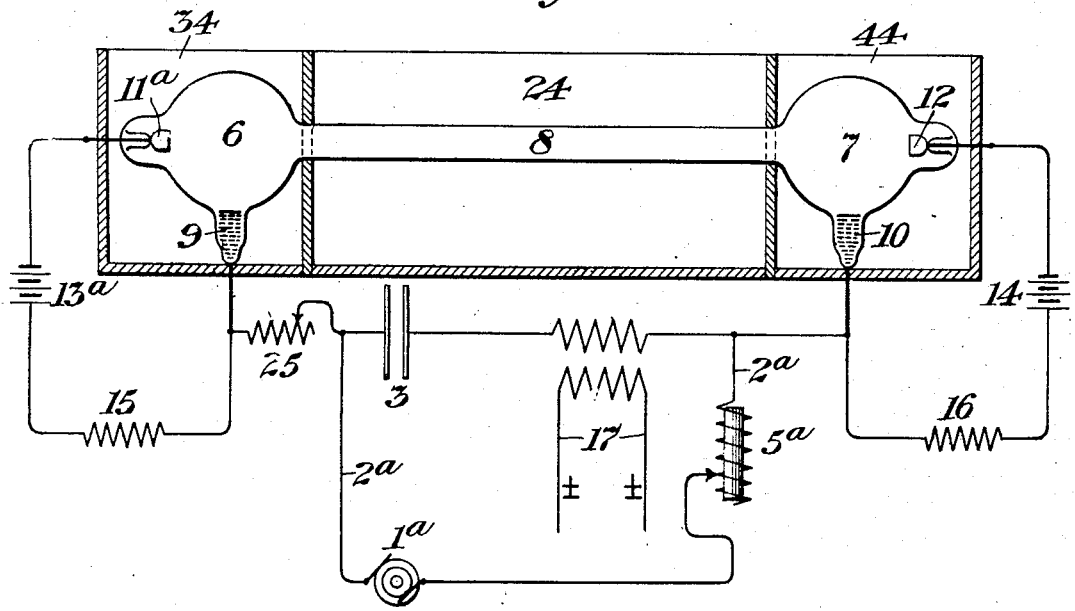

Fig. 2 is a similar view of a modified form of discharge device, adapted for alternating or oscillatory currents, the discharge device being provided with means for maintaining or modifying the temperatures at the respective electrodes and the intermediate vapor column.

In Fig. 1 a direct current source shown as a direct current generator, supplies the circuit 2, 2. Bridged across this circuit is a condenser 3 in parallel with the discharge device 4. Between the source and the condenser in series may be arranged a reactance 5, preferably an inductance coil adapted for adjustment to vary its impedance and thereby regulate the rate of supply of current from the source. The condenser 3 is connected to the distant electrodes of the discharge device. If desired, these connections could be made to other points of the supplemental circuits, hereinafter described. The discharge device 4 comprises the two electrode chambers 6 and 7 and the connecting tube 8. The electrode chambers are provided with suitable main electrodes 10 and 11, the negative electrode 10, being of disintegrating material, preferably of mercury. The main positive electrode 11, in one end of the tube, and the supplemental positive electrode 12, at the other end of the tube, are preferably of iron, but may be of carbon or other suitable material; or by slightly changing the construction, of mercury or other suitable liquid. These chambers and electrodes may be of the construction and may have substantially the characteristics of any of the devices and electrodes which I have described in my prior patents and applications and the construction may be widely varied. The main negative electrode 10 is connected so as to constitute it the negative electrode of a storage battery 14. The positive lead of said storage battery is connected to the adjacent supplemental positive electrode 12, thus completing a local battery circuit through the vapor in the chamber 7 between the supplemental positive electrode 12 and the main negative electrode 10. Between the main negative electrode and its storage battery is preferably arranged an inductance or resistance, as at 16. The purpose of this inductance is twofold. By reason of its reactance it confines the discharge of the condenser 3 to the electrode 10 and by reason of its ohmic resistance, it serves to retard and control the flow of current from the battery, which might otherwise be excessive by reason of the low resistance of its circuit. The latter function may be served by an ordinary adjustable rheostat. The inductance may serve to compensate for varying resistances at the negative electrode, but this is not necessary to the present invention. Where the object of the local battery is solely the elimination of electrode reluctance from the condenser discharge circuit, a storage battery furnishing an electromotive force of about 30 or 40 volts will be sufficient. In such case the resistance of 16 should be about 10 ohms. These figures are subject to considerable variation, but, in practice, I find that somewhere from 1 to 3 amperes is quite sufficient to maintain current flow through the electrodes 12, 10, thereby eliminating the opposition of negative electrode reluctance to the discharge of condenser 3 through the circuit 13, positive electrode 11, vapor column 8, and negative electrode 10. The current in said battery circuit may be started by any of the methods used to start my mercury vapor lamps.

It will be noted that so far as concerns the initiation of the condenser discharge, the function of the above described battery circuit is superficially somewhat similar to that of my supplemental starting electrode, which I sometimes use to start my mercury vapor lamps and rectifiers. In the present connection there is an entirely different function, which is performed at the instant of interruption or cessation of current flow and which is of great importance. As employed herein, the battery circuit operates continuously to maintain the negative electrode 10 in its broken down state of resistance, so that the negative electrode reluctance does not assert itself at the instant when the interruption occurs. The result is that the interrupting action is solely that of the vapor column 8 with all interrupting action of the negative electrode eliminated. From the above, it will also be understood that the interrupting action is quite different from that of the devices covered by my prior interrupter patents granted to me on the 31st day of January, 1905.

As is well known, the rate of discharge or oscillation of the capacity circuit will depend upon capacity, inductance and resistance of the discharge circuit and may be varied by varying the capacity of the condenser 3 or of the length of wire 13, as diagrammatically indicated at 25.

A device of the kind shown in Fig. 1, is well adapted for interrupting direct current in one direction, and the apparatus may be proportioned and arranged so that the discharge of condenser 3 will be oscillatory, but the oscillations in the two directions will not be precisely symmetrical, because the half oscillations in the direction of electrode 10 has a broken down mercury electrode for its negative electrode, whereas the oscillations in the opposite direction is subject to the unmodified action of the normally unbroken down negative reluctance at 11.

In the arrangement shown in Fig. 2, the electrodes at both ends of the vapor column 8 are physically and electrically similar and symmetrical and are both provided with the supplemental battery circuits, the electrodes 9, 11$^a$, battery 13$^a$, and impedance 15 at one end, being respectively similar to 10, 12, 14, and 16 at the other end.

In both the above described arrangements, the abrupt variations or fluctuations of current may be utilized for wireless telegraphy or any other similar or desired purpose for which such currents are useful, by transfer to an outside circuit 17 by any suitable means as, for instance, a transformer having its primary 18 in series with the condenser discharge. The circuits 1, 2, and 1$^a$, 2$^a$, may be connected around the condenser 3 and primary 18, as shown in Fig. 2, instead of around the condenser only, as in Fig. 1. The inductance 5 or 5$^a$ may be of such value as to restrain the primary current for a sufficient time to permit free discharge and if desired free oscillations of the condenser circuit 3, 25, 9, 6, 8, 7, 10, 18, before the recharging of the condenser progresses very far. The frequencies of charge and discharge of the condenser may be the same or different, as desired.

It is not necessary that the interrupter be kept cold, though this is sometimes desirable. It is important, however, to preserve uniformity of the surroundings and of the heat radiating rate, as the vapor density is determined by the temperature and this should be constant so that the operation of the device may be uniform. A hot or cold bath, maintained at the desired temperature, or a non-conducting or conducting jacket of any kind, will serve this purpose. In the drawings such devices are indicated by the inclosure 24 for the vapor column in tube 8 and inclosure 34 and 44 for electrodes 9 and 10 respectively.

In addition to the above mentioned variables of length and diameter of tube 8 are other variables including the volume and radiating surface of chamber 6, 7, and the amount of current normally maintained in the local circuits 10, 7, 12, 14, 16, and 9, 6, 11, 13, 15. Other things being equal the greater the amount of this current, the greater will be the density of the vapor column 8 and therefore the desirability of suitably arranging the surroundings with respect to radiation.

As has been stated above this invention enables me to predetermine and fix the interrupting voltage or resistance at any desired value within practical limits and this I conceive to be of particular advantage in maintaining prolonged oscillations of the condenser across the discharging device. The details of this action will be more fully explained.

The devices of the class herein described start at a certain definite voltage which is the same for a given device under given conditions. When the electromotive force has risen to a suitable point, and the passage of the current through the device has been initiated, the flow continues until the electromotive force has fallen to a much lower value than that of starting, the current is then interrupted by the reversion of the vapor column to the non-conducting condition. The device returns to substantially the original starting resistance and the original electromotive force must then be renewed or made available from some source before the device can start again. It will be noted that by the above described discharge there has been dissipation of energy by reason of the resistance in the circuit, in the lamp itself and also in the translating device or working circuit. This dissipation of energy is always something, and is frequently large, and the electromotive force available at the end of the first discharge or half oscillation would appear to be totally insufficient to initiate the starting and a flow in the other direction to complete the second half of the oscillation.

It is a fact, however, that with my interrupters under these conditions the device does start in the opposite direction and does this repeatedly so that the discharge is oscillatory and even persistently or continuously oscillatory. I account for this by the fact that the interruption of the current flow is practically instantaneous and the kinetic energy of flow is by reason of the almost instantaneous character of the stoppage, changed to potential energy of great instantaneous value.

In the present form of my discharge device as ordinarily constructed the interruption occurs so short a time before the natural cessation of current flow that the amount of kinetic energy remaining and available for change into potential energy, is small. Nevertheless even in this case the interruption is so nearly instantaneous as to cause a considerable rise or peak in the voltage curve. This peak in the ordinary case referred to, is of sufficient amplitude to restart the device in the opposite direction and the same is true of the peaks of a number of half oscillations of decreasing amplitude. It is evident, however, that if the same or a more sudden interruption is caused to take place at an earlier stage, when there is considerably more kinetic energy to be interrupted and available to be changed into potential energy, the possible amplitude of the potential peak will be much greater and by reason of this a larger number of oscillations may be possible before the energy has dissipated to a point where these peaks are no longer high enough to initiate the return swing.

My interrupter herein described may be readily caused to effect the interruption at the desired value of falling current and thus render the desired fraction of kinetic energy available for change into potential energy and the oscillations may be made of correspondingly increased persistence up to limits determined by the initial energy of the change and the rate of dissipation, etc.

I have hereinbefore specified certain voltages as desirable for the storage batteries and certain resistances as desirable for the circuits thereof and have also specified that the constantly flowing current in such circuits may in practice be somewhere from one to three amperes. If however, the condenser to be discharged is of great capacity so that the current flowing therefrom is of considerable quantity, the amperage of the local circuits should be increased so as to be always larger than the maximum instantaneous value of flux of the oscillations from the condenser flowing from the negative electrode because, as will be obvious, if at any instant the flux from a negative electrode of the oscillatory circuit becomes equal to or greater than the battery flow into said electrode, the battery flow will be interrupted and will not reëstablish itself. If, however, the amperage of the condenser discharge out of the negative electrode is always small as compared with the storage flow into said electrode, the operation of the device will be continuous. Hence the necessity of carefully considering the keepalive circuit where oscillations of large amperage are to be handled in the apparatus described herein.

In a companion application filed May 12th, 1914, Serial Number 838,032, Fig. 1 of this application is reproduced as Fig. 1 thereof, and claims are made therein to certain particular features of the system described therein.

This application is a division of my application Serial Number 267,982, filed July 1st, 1905, patented May 1st, 1917, No. 1,224,639, which, in turn, is a division of my application 264,071, filed June 7th, 1905.

I claim as my invention:

1. The combination of a capacity circuit, a source of energy therefor, and a vapor electric device connected across said circuit and having inherent uni-directional conductivity at the maximum discharging potential of said capacity circuit.

2. An apparatus for producing periodically varying currents of high frequency, comprising in combination a vapor electric device containing means for operating from one of the main electrodes and auxiliary arc, a capacity circuit connected directly across said device, and a source of energy connected to supply current to said capacity circuit.

3. The combination of a capacity circuit, a source of current, a device comprising an evacuated envelop, a cathode and an anode, said device having inherent unidirectional conductivity, ionizing means at the cathode for rendering said device conductive, and means for deionizing in part the current-carrying path of said device between current pulsations, and connections between said electrodes and said capacity circuit.

4. In an apparatus for producing high frequency pulsations, a capacity circuit, a mercury vapor device for producing current pulsations therein, said device being conductive for current in one direction and arresting current flow in the opposite direction.

5. In a high frequency apparatus, the combination of a work circuit, a capacity circuit inductively related thereto, a metal vapor arc device comprising an evacuated envelop, connections between said capacity circuit and said device, means for continuously furnishing ionized vapor in said device and means for deionizing the arc path between successive current pulsations from said capacity circuit.

6. In a high frequency apparatus, a work circuit, a capacity circuit inductively related thereto, a source of energy, and mercury vapor rectifying means operatively connected across said capacity circuit to produce current pulsations in said capacity circuit, said means being deionizable between successive current pulsations.

7. In a high frequency apparatus, a work circuit, a winding inductively related to said work circuit, a condenser connected to discharge through said winding, a vapor arc device having conductivity in one direction only connected to prevent reverse discharge from said condenser through said winding, and means for deionizing at least in part the current carrying path of said device between successive condenser discharges.

8. The combination with a vapor electric device having a continuously operative ionizing means, of means for applying to the terminals of said device a periodically varying potential having a maximum value high enough to start an arc in said vapor device, and having a minimum value insufficient to support the arc.

9. The combination of a circuit containing electrical capacity and inductance, a source of energy therefor, a mercury vapor electric device connected across said circuit and having unidirectional conductivity at the maximum discharging potential of said capacity, and an impedance device connected between said source and said vapor electric device.

10. The combination of a work circuit, a capacity circuit inductively related thereto, a source of energy for said capacity circuit, a mercury vapor electric device connected across said capacity circuit, having unidirectional conductivity at the maximum discharging potential of said capacity circuit, and being proportioned to dissipate heat from the arc path at such rate that the arc will assume a condition of low conductivity between successive discharges of the capacity circuit, and means for artificially cooling said device to maintain the continuity and speed of current pulsations therein.

11. The combination of a capacity circuit, a source of energy for said circuit, and a vapor electric device connected across said capacity circuit and carrying energy discharged therefrom, said vapor electric device having an auxiliary arc.

12. The combination of a source of current, a rectifying electric device receiving energy from said source and having means for supplying conductive vapor, a capacity circuit connected across said vapor electric device, and periodically discharging therethrough unidirectionally, and a work circuit inductively related to said capacity circuit.

13. In an apparatus for producing periodic currents of high frequency, the combination of a capacity circuit, a source of energy therefor, and means for conducting energy discharged from said capacity circuit, said conducting means having a continuously operative ionizing means, and being proportioned to dissipate heat at such rate that the vapor in said path will assume a condition of low conductivity between successive discharges of the capacity circuit.

14. The combination of a capacity circuit, a source of energy therefor, and means for discharging said capacity circuit, said means including a vapor path having continuously operative means for ionizing a portion near the cathode only of said vapor path.

15. In a system for producing periodic currents of high frequency, the combination of a source of energy, a capacity circuit connected therewith, means providing a vapor path for the discharge of energy from said capacity circuit, said means being proportioned to dissipate heat from the arc path at such rate that the vapor path assumes a condition of low conductivity between successive discharges of the capacity circuit, and an auxiliary arc continuously operative to ionize a portion, at least, of said path.

16. In a system for producing high frequency current pulsations, the combination of a capacity circuit, an inclosed metal vapor electric device connected across said circuit and having unidirectional conductivity at the maximum discharge potential of said circuit, and means for externally cooling said vapor electric device to increase the speed at which said capacity circuit may periodically discharge.

17. In an apparatus for producing periodic currents of high frequency, the combination of a capacity circuit, a source of energy therefor, and a vapor electric device connected across said source, said vapor electric device having a side branch and having a main arc path inclosed by an envelop proportioned to deionize the arc path at such rate that the vapor device will assume a condition of low conductivity between successive discharges of the capacity circuit.

18. In a system for the transformation of electrical energy, the combination of a capacity circuit, a source of energy connected to charge said circuit and a vapor electric device providing a discharge path for energy from said capacity circuit, said vapor electric device having a tubular portion through which the discharge may pass, proportioned to deionize the arc path at such rate that the vapor device will assume a condition of low conductivity between successive discharges of the capacity circuit, and means at one end thereof for maintaining continuous ionization.

19. In a system for transforming electrical energy, the combination of a capacity circuit, a source of energy for charging said circuit, and a vapor electric device connected to receive energy discharged from said circuit, said vapor electric device having enlarged ends which are connected by a constricted tube proportioned to deionize the arc path at such rate that the vapor device will assume a condition of low conductivity between successive discharges of the capacity circuit, said device having at its cathode end only means for maintaining an auxiliary arc.

20. In a system for the transformation of electrical energy, the combination of a work circuit, a winding inductively related thereto, a condenser in circuit with said winding, a source of energy for charging said condenser, and a vapor electric device proportioned to form a unilateral discharge path for said condenser, said vapor electric device having means for maintaining an auxiliary arc at the cathode.

21. An apparatus for producing periodic currents of high frequency comprising a capacity circuit, a source of energy for charging said circuit, a cathode directly connected to one side of said circuit, an anode directly connected to the other side, and a second anode coöperating with said cathode to maintain a discharge path over which said capacity circuit may discharge.

22. The combination of a source of energy, a capacity circuit connected across said source, a cathode directly connected to one side of said capacity circuit, an anode directly connected to the other side, a second anode and means for continuously maintaining an arc between said second anode and said cathode.

23. The method of producing intermittent currents in a capacity circuit which consists in charging and periodically discharging said circuit through a vapor electric device having inherent unilateral conductivity at the maximum potential of said discharge.

24. The method of producing periodic currents in a capacity circuit which consists in periodically discharging said circuit through a vapor electric device which has ionizing means continuously operative, and controlling the character of said periodic current by controlling the temperature of said electric device.

25. The method of increasing the speed at which a capacity circuit can discharge through a vapor electric device which has an evacuated envelop, an anode and a cathode, said method consisting in maintaining ionization near the cathode of said device, and confining the flow of current from said anode to said cathode within a narrow path.

26. The method of producing periodic currents in a condenser connected to a source of energy and shunted by an evacuated vapor electric device, which consists in periodically charging the condenser from the source and discharging the condenser at a single impulse through the vapor electric device, and effecting speedy deionization by externally cooling a portion of said device.

27. The method of transforming energy in a system having a capacity circuit shunted by a vapor electric device, which consists in maintaining continuous ionization at the cathode in said device, discharging said capacity circuit therethrough, and applying the pulsations thus produced to initiate oscillations in a work circuit coöperatively related to said capacity circuit.

28. The method of distributing electrical energy, which consists in supplying current to a capacity circuit, periodically diverting energy from said circuit through an electric discharge device having inherent unidirectional conductivity, and having a continuously operative ionizing means, deionizing the current carrying path between successive pulsations of current, and inductively transforming the pulsations thus produced into oscillating current of the desired voltage.

29. The method of producing periodic currents in a capacity circuit shunted by a device affording an electric discharge path of inherent unidirectional conductivity having ionizing means constantly operative, which consists in periodically diverting energy from said circuit through said path, and controlling the character of the pulsating current thus produced by deionizing said path.

30. In a system of electrical distribution, the combination with means for producing intermittent current impulses, all attaining a definite maximum potential, of a self restoring discharge gap therefor comprising a closed container, a gas or vapor column therein, electrodes also therein separated by said body of gas or vapor and means for continuously eliminating the cathode starting resistance of at least one of said electrodes.

31. In a system of electrical distribution, the combination with an electrostatic condenser, a circuit therefor and means for charging said condenser, of means permitting the intermittent free discharge of said condenser when charged to a critical potential, said means comprising a closed container, a body of gas or vapor therein including a central portion and two end portions, electrodes in said end portions and means for continuously eliminating resistance to current flow from the container at one of said electrodes.

32. In a system of electrical distribution, the combination with a source of electrical energy, means for storing energy and discharging said energy at a rate independent of the time period of the source and connections between said source and said storing means, of a self restoring discharge gap therefor comprising an exhausted container, electrodes therein, a body of gas or vapor between said electrodes and means for continuously suppressing the cathode starting resistance at one electrode independent of current flow through said body of gas or vapor.

33. In a system of electrical distribution, the combination with a source of electrical energy, means for storing energy and discharging said energy at a rate higher than the time period of the source and connections between said source and said storing means, of a self restoring discharge gap therefor comprising an exhausted container, electrodes therein, a body of gas between said electrodes and means for continuously suppressing the cathode starting resistance at one electrode independent of the flow of current through said body of gas or vapor.

34. The method of controlling the character of periodic currents produced in a capacity circuit connected to a source of energy and shunted by a vapor electric device having an anode and a cathode, which method consists in discharging said capacity circuit at a single impulse between said anode and said cathode, maintaining continuous ionization in the neighborhood of said cathode, and effecting rapid deionization in the neighborhood of said anode.

35. A source of electrical energy and a reactance circuit adapted to store up and discharge said energy at definite rates and during time periods small as compared with the time during which the energy flows from said source, in combination with a discharge gap in said circuit, comprising a gas or vapor path, and means for modifying the negative electrode reactions at the end of said path where the current leaves the vapor path, said means comprising connections for causing current flow into said negative electrode independently of the presence or absence of current flow in the part of the vapor path used as the discharge gap.

36. A source of electrical energy and a reactance circuit adapted to store up and discharge said energy at definite rates and during time periods small as compared with the time during which the energy flows from said source, in combination with a discharge gap in said circuit, comprising a gas or vapor path, and means for modifying the negative electrode reactions at the end of said path where the current leaves the vapor path, said means comprising means for maintaining said negative electrode in conducting condition independently of the presence or absence of current flow in the part of the vapor path used as the discharge gap.

37. A source of electrical energy and a reactance circuit adapted to store up and discharge said energy at definite rates, and during time periods small as compared with the time during which the energy flows from said source, in combination with a discharge gap in said circuit, comprising a gas or vapor path, and having the negative electrode reluctance at one end of said path where the current leaves the vapor path, continuously broken down, independently of the presence or absence of current flow in the part of the vapor path used as the discharge gap.

38. An exhausted vapor electric device, a vapor column and electrodes therein and means for utilizing the characteristic properties of said vapor column as a discharge gap, said means consisting of a source of electric current, an intermittent discharge circuit connected with said device and said source and including a receiving apparatus, and means for continuously eliminating the cathode starting resistance in the path of actual current discharges through said device.

39. In a system of electrical distribution, means for utilizing the difference between the starting and running resistance of the vapor column of a vapor electric device to produce a series of discharges in a suitable receiving circuit, said means comprising a source of current, an energy storing circuit, a vapor device provided with a vapor column connected to receive a discharge from said storing circuit and means continuously eliminating the negative electrode starting reluctance in the path of said discharges.

40. In a system of electrical distribution, the combination with a source of electric current, a discharge circuit and an exhausted vapor device connected therewith, of means for utilizing the vapor column of said device unmodified by cathode starting resistance as a discharge gap, said means consisting of an auxiliary current circuit, including at least one electrode of said vapor device, continuously excited to maintain said included electrode operating as a cathode.

41. In a system of electrical distribution, the combination with a source of electric current, a discharge circuit and an exhausted vapor device connected therewith, of means for utilizing the vapor column of said device unmodified as a discharge gap, said means consisting of means for operating on an electrode of said device to continuously eliminate its cathode starting resistance.

42. In a system of electrical distribution, the combination with a source of electric current, a condenser supplied therefrom, and an impedance device in circuit with said condenser, of a discharge device in shunt to said condenser comprising an exhausted container having a narrow vapor portion, an electrode therein at one end of said narrow portion, and means for causing said electrode to act as the cathode of a continuous current arc.

43. In a system of electrical distribution, the combination with a source of electric current, and an intermittently-operating series discharge circuit connected therewith, of a constantly active electrode in the discharge circuit.

44. In a system of electrical distribution, the combination with a source of electric current, and a periodically intermittently-operating discharge circuit connected therewith, of a constantly active electrode in the discharge circuit.

45. In a system of electrical distribution, the combination with a source of electric current, a periodically intermittently-operating discharge circuit and a vacuum electric device connected therewith, of a constantly active electrode in the discharge circuit.

46. In a system of electrical distribution, the combination with a source of electric current, an intermittently operating series discharge circuit and a vacuum electric device connected therewith, of a constantly active electrode in the discharge circuit.

47. In a system of electrical distribution, the combination with a source of electric current, and a series discharge circuit connected therewith, of a constantly active electrode in the discharge circuit.

48. In a system of electrical distribution, the combination with a source of electric current, and a discharge circuit connected therewith, of a constantly active electrode in the discharge circuit operating periodically to maintain the circuit in a predetermined operating condition.

49. The combination with an electric device consisting of a sealed container and a plurality of terminals therein, and having a continuously operative energizing means, of means for applying to the said device a periodically varying potential having a maximum value high enough to start current flow in said device and having a minimum value insufficient to support the said current flow.

50. In a system of electrical distribution, the combination with a source of electric current, of an electric device having a rising-voltage-decreasing-current characteristic connected therewith, said electric device comprising a container and terminals inclosed therein, and a continuously operating energizing means for one of said terminals.

51. In a system of electrical distribution, the combination with a source of electric current, of an electric device having a rising-voltage-decreasing-current characteristic connected therewith, said electric device comprising a container and terminals inclosed therein, one of said terminals maintaining the device in a predetermined operating condition.

52. In a system of electrical distribution, the combination with a source of electric current, of an electric device having a rising-voltage-decreasing-current characteristic connected therewith, said electric device comprising a container and terminals inclosed therein, one of said terminals periodically maintaining the device in a predetermined operating condition.

53. In a system of electrical distribution, the combination with a source of electric current, of an electric device having a rising voltage-decreasing current characteristic connected therewith, said electric device comprising a container and terminals inclosed therein, one of said terminals being connected with a separate current supply.

54. In a system of electrical distribution, the combination with a source of electric current, of a vacuum electric device having a rising voltage-decreasing current characteristic connected therewith, said electric device comprising a container and terminals inclosed therein, one of said terminals being connected with a separate current supply.

Signed at New York in the county of New York and State of New York this 15th day of April, A. D. 1915.

PETER COOPER HEWITT.

Witnesses:
WALTER E. F. BRADLEY,
RAYNER M. BEDELL.